(12) United States Patent
Prater

(10) Patent No.: US 6,446,325 B1
(45) Date of Patent: Sep. 10, 2002

(54) METHOD OF MAKING A SWAGABLE METAL ARM TIP FOR A CERAMIC ACTUATOR ARM

(75) Inventor: Walter L. Prater, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/470,586

(22) Filed: Dec. 22, 1999

(51) Int. Cl.[7] .................................................. G11B 5/42
(52) U.S. Cl. ............................. 29/603.03; 360/244.4; 360/244.6; 360/244.7; 360/245.2
(58) Field of Search .................... 29/603.03, 603.04, 29/603.05, 603.06; 360/244.4, 244.5, 244.6, 244.7, 245.2

(56) References Cited

U.S. PATENT DOCUMENTS

| | | | |
|---|---|---|---|
| 5,495,375 A | 2/1996 | Baasch et al. | 360/104 |
| 5,551,997 A | 9/1996 | Marder et al. | 148/437 |
| 5,621,590 A | 4/1997 | Pace et al. | 360/106 |
| 5,672,435 A | 9/1997 | Born et al. | 428/539.5 |
| 5,717,545 A | 2/1998 | Brooks, Jr. et al. | 360/104 |
| 5,768,064 A | 6/1998 | Baasch et al. | 360/106 |
| 5,803,154 A | 9/1998 | Sugawara et al. | 164/120 |
| 5,879,478 A | 3/1999 | Loue et al. | 148/438 |
| 5,879,578 A | 3/1999 | Chung et al. | 216/100 |
| 5,949,615 A | 9/1999 | Hernandez | 360/104 |

OTHER PUBLICATIONS

US 5,140,481, 8/1992, Cain et al. (withdrawn)

*Primary Examiner*—Carl E. Hall
(74) *Attorney, Agent, or Firm*—Robert B. Martin; Bracewell & Patterson, L.L.P.

(57) ABSTRACT

A method of forming a swagable metal actuator arm tip having a metal swage plug for ceramic actuator arms, the method comprising the formation of a metal swage plug within a tip opening in an actuator arm, the metal insert being an appropriate metal in either solid, thixoformable solid, or liquid (molten) form. The insert, once formed or adhered within the tip opening, constitutes the metal swage plug. There are six basic methods by which the metal insert can be formed or adhered into the tip opening to form the metal swage plug: cold forming, die casting, pressure infusion casting, forging, thixoforming, or the use of adhesives.

38 Claims, 5 Drawing Sheets

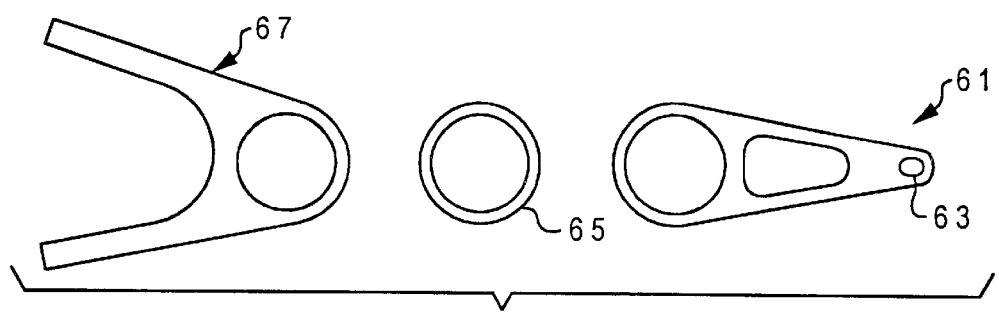
Fig. 7A
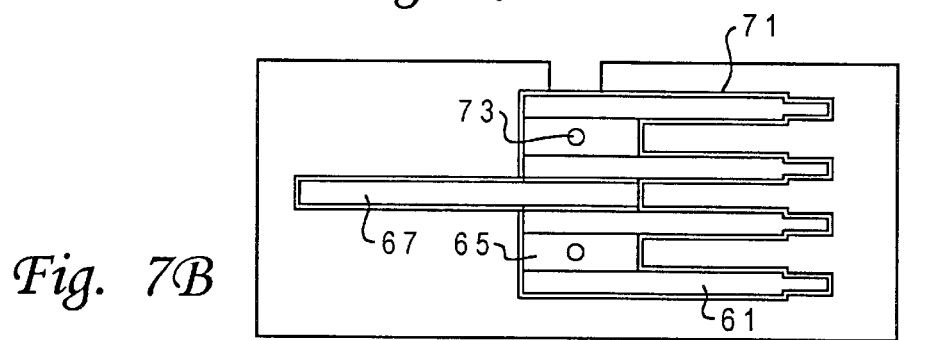
Fig. 7B
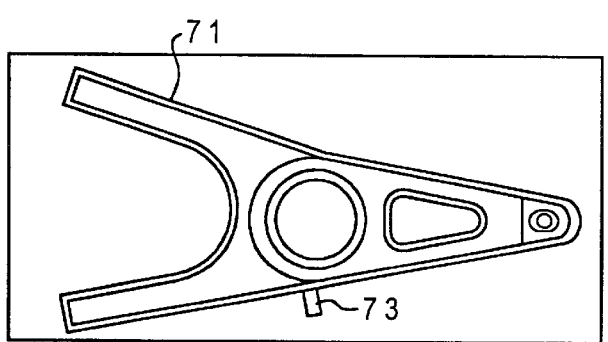
Fig. 7C
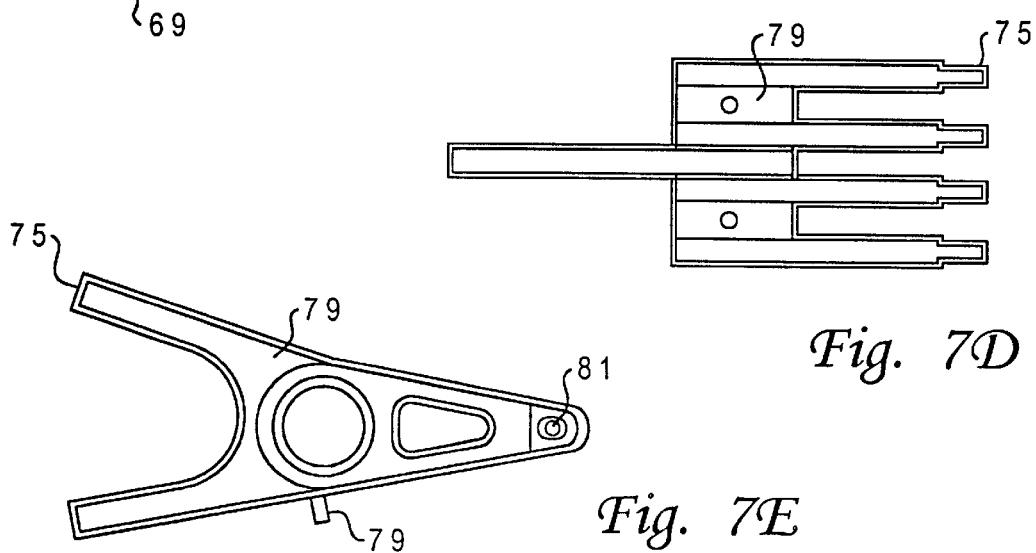
Fig. 7D
Fig. 7E

METHOD OF MAKING A SWAGABLE METAL ARM TIP FOR A CERAMIC ACTUATOR ARM

BACKGROUND OF THE INVENTION

1. Technical Field

The present invention relates generally to improvements in disk drive systems and in particular to mounting head gimbal assemblies with read/write heads coupled to actuator arms. Still more particularly, the present invention relates to a method of forming a swagable metal arm tip for swaging a head gimbal assembly to a ceramic actuator arm or E-block.

2. Description of the Related Art

An ongoing objective of the disk drive industry is to produce disk drive systems with increasing storage capacity, decreased size, and faster response time. One approach to increasing the storage capacity of a disk drive is to increase the number of disks. However, as the number of disks increases, the height of the disk drive also increases. To maintain the desired size and storage capacity of the disk drive, there is a continuous incentive to reduce the spacing between disks. Additionally, certain applications require low profile (thin) disk drives which, again, demand thin arms and narrow disk spacings. As a limiting design factor, the space between disks must be sufficient to accommodate two read/write heads and two load beam assemblies on which the read/write heads are mounted, and an arm. FIG. 1 illustrates this arrangement of a disk drive 101 having an E-block assembly with multiple actuator arms 113 and with multiple disks 103, each arm 113 having a head gimbal assembly (HGA) 105 made up of one or two load beams 111 and the read/write head 109. The voice coil 107 controls the actuator arms that pivot on the arm hub 115.

While attempting to reduce the spacing between disks, there is also a desire to adjust other properties of the actuator arms such as density, stiffness and damping ability. In order to achieve these properties, there has been a shift to the use of ceramic materials in manufacturing the actuator arms such as that disclosed in U.S. Pat. No. 5,672,435. Alumina and silicon carbide are the simplest and most common ceramic materials used, although other ceramics and composites are also common in the art. The use of these alternative materials for the internal components of hard drives decreases the density while increasing the specific stiffness of those components, leading to performance improvements over traditional drives which employ conventional materials.

While improving the density, stiffness and vibrational qualities of the actuator arms, thus increasing the response time of the arms as they move over the disks, the arms are more brittle and thus more difficult to machine. Machining often results in cracking and chipping of the ceramic arms, as opposed to the use of metal which is more machinable. In particular, machining is often required to form an attachment means for the HGA. Swaging, as one preferred means of HGA attachment to arms, can in turn lead to problems in actuator arm cracking. Welding is another preferred method of HGA attachment, which is possible on metal arms, but is very difficult on ceramic arms. An added problem to present ceramic arms is that the use of alumina and silicon carbide and other ceramic materials that have low electric conductivity results in electrostatic charge buildup which is not easily discharged. Therefore, data destruction due to a build-up and sudden discharge of electrical charges can occur.

While trying to reduce the spacing between disks, there is a desire to also reduce the mass of the actuator and HGA so as to decrease the response time of the disk drive. One way of reducing the mass of the head HGA is to bring the actuator pivot 115 closer to the center of the disk stack 117, as shown in FIGS. 1 and 2. Reducing the disk diameter results in shorter, and thus lighter, lower inertia HGAs and arms. The preferred way to achieve the smallest possible spacing between the actuator pivot center and the center of the disk stack is for the actuator arms 113 to fit between the disks 103 as shown in FIG. 2. Therefore, the space between disks must be sufficient to accommodate not only two read/write heads 109 and two load beams 111, but also an actuator arm 113 and the attachment means for attaching the HGA assembly to the arm.

Some prior art disk drives attempt to reduce the number of components between disks by attaching the load beams directly to the actuator arms, as, for example, by welding the load beams to the arms. Since metal HGAs can not be directly welded to ceramic arms, another method of attaching HGAs to the arms by means of swaging techniques must be used. Prior art swaging techniques involved swaging a spud, or boss, made of a hard material into an actuator arm made of a soft material. During the prior art swage process, an oversize, hard ball enlarges the spud cylinder into the inside surface of the actuator arm hole, causing the outside surface of the spud cylinder to "bite" into the inside surface of the actuator arm hole. However, with the use of hard, brittle ceramic material, the current swaging techniques will not "bite" into the actuator arm and can cause the actuator arm hole to fracture.

SUMMARY OF THE INVENTION

It is therefore one object of the present invention to provide a means to attach a head-gimbal-assembly to a ceramic or metal matrix composite actuator arm.

It is another object of the present invention to provide an actuator that has low inertia to reduce seek times and high stiffness to increase both servo bandwidth and shock resistance.

It is another object of the present invention to provide a means to weld a metal suspension to a ceramic arm.

It is another object of the present invention to provide a means to remove and reattach HGA's from a ceramic arm.

It is yet another object of the present invention to provide a conductive metal outer surface to the ceramic arm.

The preferred aspect of the invention is a swagable ceramic actuator arm that is formed by placing a metal insert into a hole in the actuator arm and forming or adhering the metal insert within the hole, the adhered or formed metal insert thus constituting a metal swage plug that can then be machined further. The foregoing are achieved as is now described. A swagable metal actuator arm tip having a metal swage plug for ceramic actuator arms is made by first providing at least one actuator arm formed from a ceramic material and having a tip opening, the tip opening having an inner edge of a defined thickness. Next, a metal insert is formed or adhered within the tip opening having a thickness that is substantially similar to the thickness of the inner edge, the metal insert also having an outer edge that makes cohesive contact with the inner edge of the tip opening. Third, a swage annulus is formed within the metal insert, the swage annulus having a predetermined inner swaging diameter, the predetermined inner swaging diameter being sized to accept a swage ball coupling of a tip gimbal assembly, whereby the metal insert provides a means of attaching the head gimbal assembly to the actuator arm. There are six basic methods by which the metal insert can be formed or adhered into the tip opening to form the metal swage plug: cold forming, die casting, pressure infusion casting, forging, thixoforming, or the use of adhesives.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 7A through 7E are a process sequence for pressure infusion casting that creates a continuous metal skin over a ceramic core; FIG. 7A is a top view of the basic components of an E-block; FIG. 7B is a side view of an E-block within a mold; FIG. 7C is a top view of an E-block within a mold; FIG. 7D is a side view of a metalcoated E-block; FIG. 7E is a top view of a metal-coated E-block;

DETAILED DESCRIPTION OF THE PREFERRED EMBODIMENT

The preferred aspect of the invention is a swagable ceramic actuator arm that is formed by placing a metal insert into a hole in the actuator arm and forming or adhering the metal insert to the hole, the adhered or formed metal insert thus constituting a metal swage plug that can then be machined further. with reference now to the figures, and in particular with reference to FIG. 3, is shown one embodiment of an actuator arm tip 11 having a tip opening 15, and portions 13 that extend to the body of the E-block. The tip opening 15 can be formed during the process of manufacturing the ceramic actuator arm itself through processes such as molding or laser scribing, known to those skilled in the art. The actuator arm is made preferably from a ceramic material such a boron carbide, silicon carbide, silicon nitride and alumina. The ceramic material may also be a ceramic composite such as aluminum boron carbide. The arm and/or E-block is pre-molded, densified and sintered or reacted prior to forming the metal insert of the invention. It is to be understood that reference to an actuator arm is equally applicable to an E-block, the E-block having a series of such actuator arms.

Figure 1:
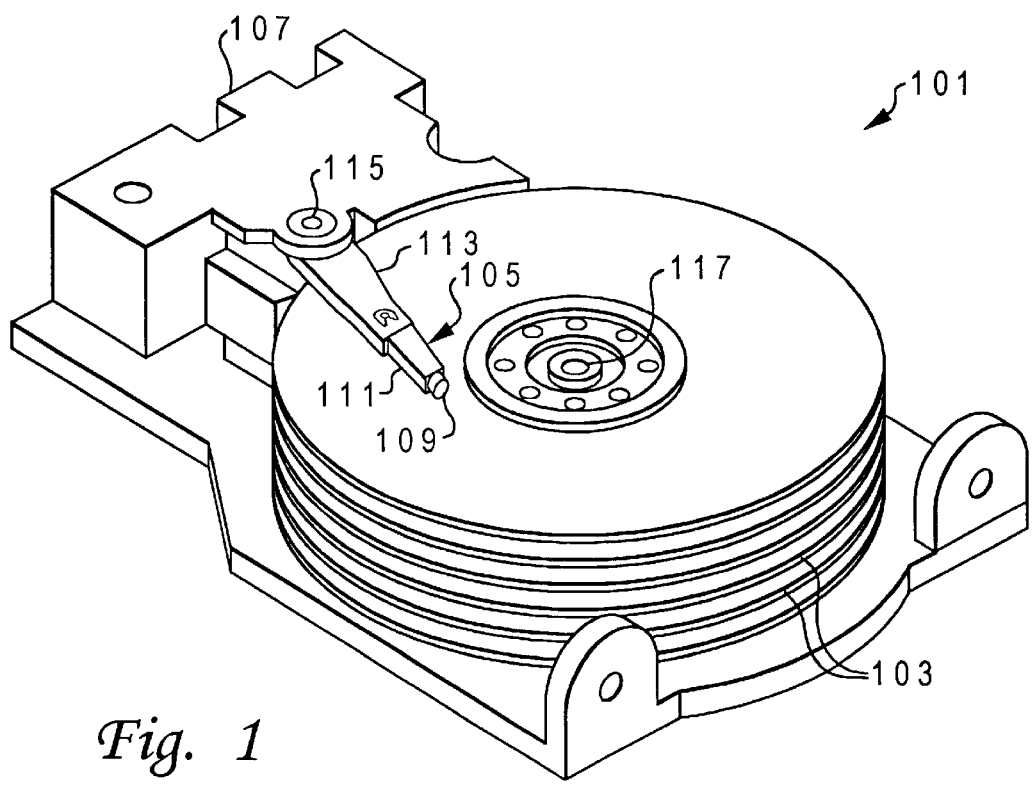
FIG. 1 depicts a perspective, generalized view of an exposed disk drive.
Figure 2:
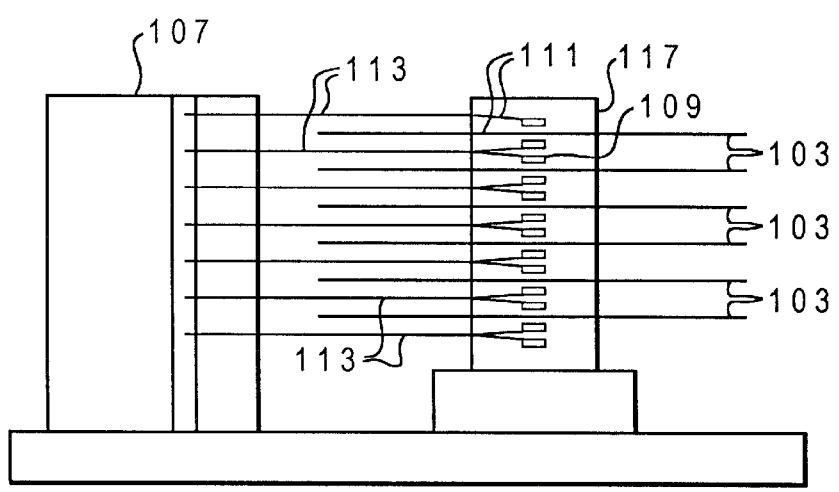
FIG. 2 depicts a cutaway side view of a disk drive assembly.
Figure 3A:
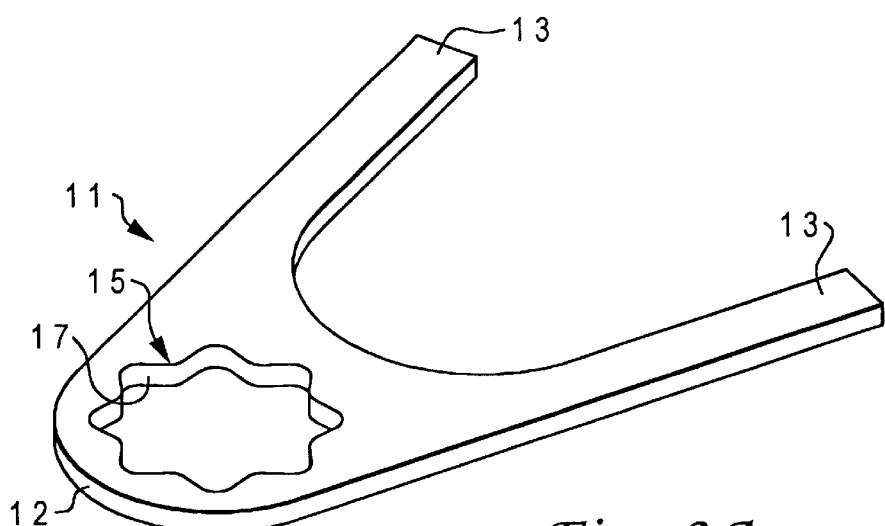
FIG. 3A is a perspective view of an actuator arm.
Figure 3B:
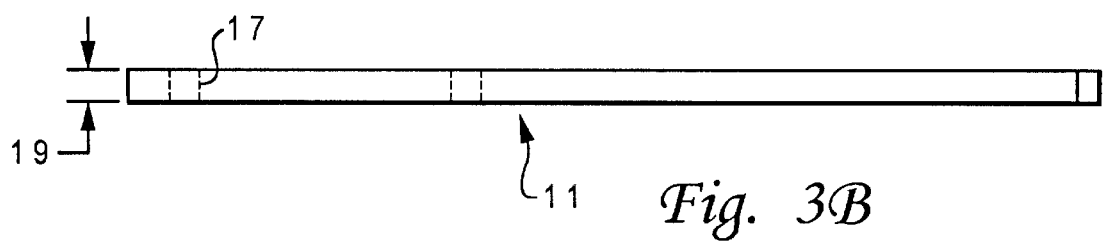
FIG. 3B is a side view of an actuator arm.
Figure 8:
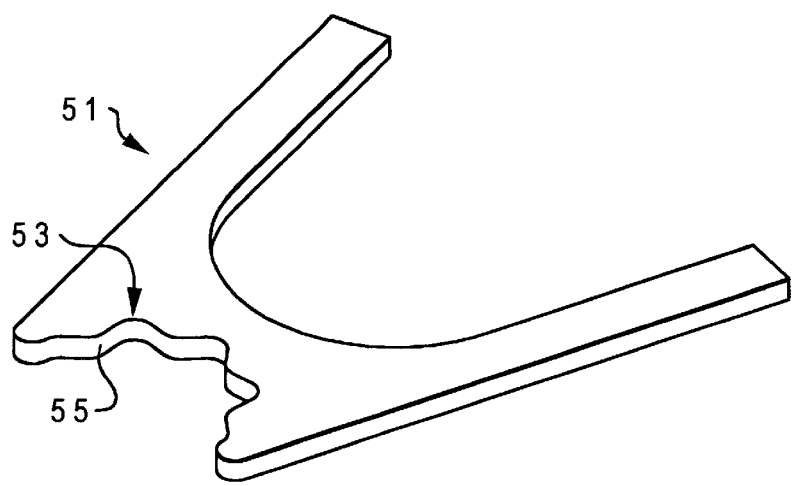
FIG. 8 is a perspective view of an embodiment of the actuator arm having an non-continuous tip opening.

The tip opening 15 can take many different forms. The embodiment shown in FIG. 3A shows regular serrations forming the inner edge 17 of a continuous, circular tip opening. However, the tip opening can also take the form of, for example, a semi-circle with serrations or other irregular formations on the inner edge. Further, the tip opening may not be continuous, but may be an open semicircle or other open shape wherein the tip opening is cut or formed into the tip edge 12 of the actuator arm. One such open form is shown in FIG. 8, wherein actuator arm 51 having inner edge 55 is formed into the tip opening 53. The general shape of the tip opening in FIG. 8 is a non-continuous semi-circle having serrations. Referring to FIG. 3B, the inner edge having of thickness 19 is shown. There can also be dovetails, or tapers, or a combination of these. One purpose of having these irregular formations for the inner edge 17 is to provide a more cohesive surface (higher surface area) for the metal insert that is formed within.

Figure 4A:
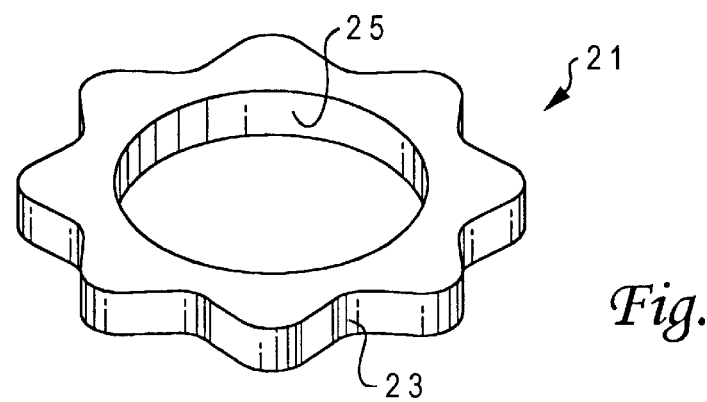
FIG. 4A is a perspective view of a metal swage plug.
Figure 4B:
FIG. 4B is a side view of a metal swage plug.

A metal insert 21 of the invention is shown in FIGS. 4A and 4B. The metal insert, in whatever form, is placed within the tip opening. Once formed (by forging, die casting, pressure infusion casting or thixoforming) or adhered (as by cold forming or using adhesive) within the tip opening, the metal swage plug of the invention is thus formed, the metal swage plug making the actuator arm a swagable metal actuator arm tip. The metal insert can be solid, semi-solid, or liquid (molten metal) in form. More particularly, the metal insert may be either a solid, preformed structure as shown in the embodiment in FIGS. 4A and 4B, or the metal insert may be a metal material that solidifies within the tip opening. The embodiment of the metal insert 21 shown in FIGS. 4A and 4B has a regular form of serrations in its contact surface 23, and has a preformed swage annulus 25 of a desired diameter. Preferably, the diameter should be slightly smaller than the diameter of the corresponding HGA swage spud used to swage the HGA to the actuator arm. Preferably, the diameter of the metal insert 21 should be slightly larger than the tip opening in which it is inserted, when the plug is a preformed solid.

The metal insert can be made from many different materials. Ideally, the materials should have a relatively low density, be ductile, and have good damping qualities. In some instances it may be necessary for the material to readily wet the ceramic surface that it contacts. In particular, the metal insert can be made from such materials as aluminum, zinc, or magnesium, or alloys thereof. Examples of desirable alloys that are preferably alloys that can be cast, thixo-formable or cold formable such as beryllium containing alloys of aluminum and aluminum compositions containing silicon, copper, magnesium, zinc, iron. The above examples by no means limit the identity or relative composition of metals and alloys that can be used for the metal insert of the invention. Use of a metal insert to thus form the metal swage plug of the invention allows a defective HGA to be removed and a new HGA swaged in its place. In contrast, welded HGA arm assemblies can not be reworked.

Figure 5:
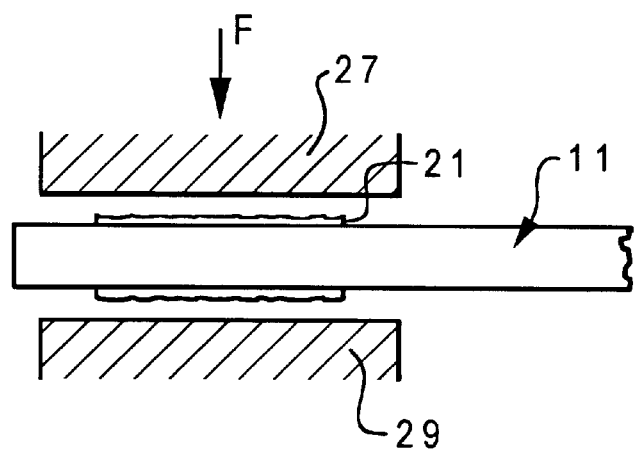
FIG. 5 is a stylized side view of the cold forming or forging process of a swage plug.
Figure 6:
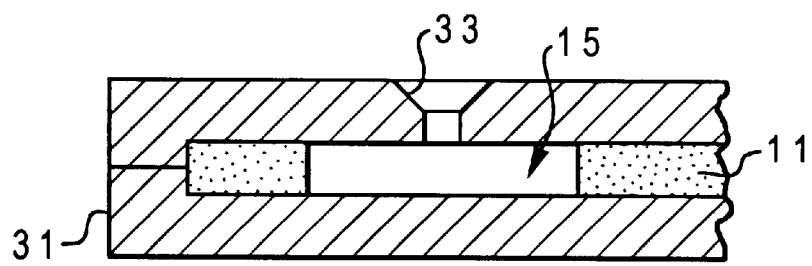
FIG. 6 is a stylized side view of the thixoforming and casting process.

The metal swage plug of the invention that forms the swagable actuator arm is derived from the metal insert 21. There are six basic methods by which the metal insert 21 can be formed or adhered into the tip opening to form the metal swage plug: cold forming, die casting, pressure infusion casting, forging, thixoforming, or the use of adhesives. The method of forming or adhering the metal plug within the tip opening is shown in FIGS. 5 and 6. In particular, FIG. 5 shows a cross-sectional, simplified view of cold forming or forging the metal swage plug 21 to form the metal insert. The actuator arm tip 11 is placed between a hammer unit 27 and an anvil unit 29, the arm being placed with the metal insert 21 inserted into the tip opening 15. The hammer unit 27 applies a force "F" upon the top of the metal insert 21, while the anvil 29 resists with equal force from below the metal plug. The applied force results in plastically deforming the metal insert so that the metal flows within the tip opening, creating a continuous and cohesive joint between the contact surface 23 of the swage plug and the inner edge 17 of the tip opening. The upset swage plug may or may not have a swage annulus 25 at this point. The swage annulus may be preformed, or formed after the upsetting step. However, even if preformed, the swage annulus may require further forming since the upsetting step may change the shape and diameter of the swage annulus.

The general methods of thixoforming and die casting are shown in FIG. 6. The actuator arm tip 11 is set within a cast mold 31, the mold having a means 33 for allowing the passage of the metal insert 21 made of thixoformable material or molten material into the tip opening 15. Typical thixoformable material includes alloys of zinc, magnesium and aluminum. Examples of suitable methods of thixoforming are disclosed in U.S. Pat. Nos. 5,803,154 and 5,879,479, and Ser. No. 09/193,879 (filed on Nov. 18, 1998). The thixoformable material is forced into the cavity formed by the tip opening 15 within the mold and allowed to solidify, creating a continuous and cohesive joint between the metal swage plug and the inner edge 17 of the tip opening.

The metal insert can also be die cast into the tip opening 15 as shown in FIG. 6, wherein a molten metal material such as zinc or aluminum is pored or injected through a means 33 into the space formed by the tip opening 15 and the mold 31. The molten metal insert is allowed to cool, thus creating a continuous and cohesive joint between the metal insert and the inner edge 17 of the tip opening. The final product is the metal swage plug formed within the tip opening.

When forming or adhering the metal insert 21 into the tip opening by cold forming, forging, die casting, thixoforming, or pressure infusion casting, the joint created between the metal insert and inner edge 17 can be made more adhesive by first sputtering a very thin film of the appropriate metal on the inner edge 17. Typically, the metal of choice would be the metal that makes up the metal insert 21. The method of sputtering is known to those skilled in the art.

Another method of forming or adhering the metal insert into the tip opening 15 in order to form the metal swage plug is by placing an adhesive on either the inner edge 17, the contact surface 23, or both, then placing the metal insert within the tip opening 15 in order to create a continuous and cohesive joint between the metal insert contact surface and the inner edge of the tip opening. Some typical adhesives would be acrylics, epoxies and urethanes.

The metal swage plug 41 can also be formed by pressure infusion casting, wherein molten metal is injected into a die cavity containing ceramic preforms of the desired E-block shape, as shown in FIG. 7A though 7E. FIG. 7A shows the basic components of the E-block, wherein porous ceramic arm 61 having tip opening 63 is coupled to spacer ring 65 and coil yoke 67, all of which are also made of porous ceramic. These components, once assembled, are placed within a mold 69 (FIG. 7B and 7C) having a cavity that is slightly larger than the assembled E-block, thus leaving a substantially uniform cavity 71 around the E-block. Further, there is also typically provided a electronic module ground pin form 73 within the form 69, thus allowing the formation of an arm electronic module ground pin 77 (FIG. 7D and 7E). The desired molten metal is then injected into the mold. When molten metal is used to form the metal swage plug, the quantity of molten metal that forms within the tip opening 63 is the metal insert. The quantity of molten metal that hardens and thus forms and adheres to the tip opening constitutes the metal swage plug 81. The molten metal surrounds the ceramic E-block shape and fills the arm tip openings 63 where there are holes in the ceramic preform. This forms both the metal swage plug 81 and a continuous metal skin 75 which provides a ground path across the E-block body by connecting the HGA to the arm electronics module ground pin. Thus, instead of swaging, the HGA can then be connected to the actuator arm by welding the HGA to the metal skin. Alternately, the metal swage plug 81 can be drilled by means known to those skilled in the art, and the HGA can then be swagged by S inserting a spud having a diameter that is slightly larger than the swage annulus formed by drilling.

Figure 9A:
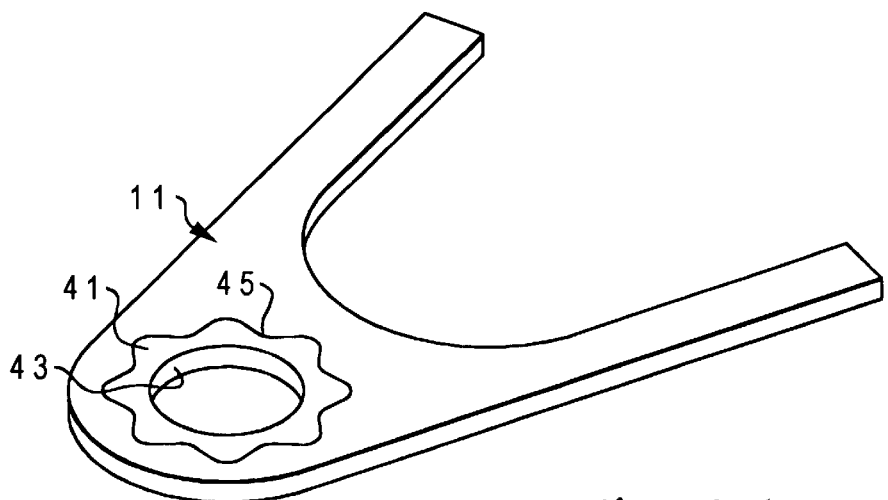
FIG. 9A is a perspective view of a swagable metal actuator arm.
Figure 9B:
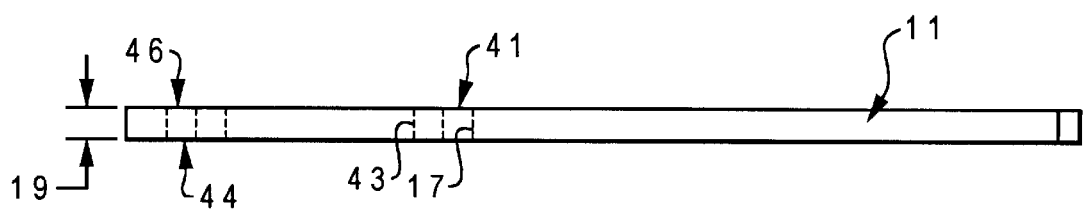
FIG. 9B is a side view of the swagable metal actuator arm.

FIG. 9A and FIG. 9B shows the swagable actuator arm of the invention having the metal swage plug of the invention. After the steps of forming or adhering, the metal swage plug 41 is formed into arm tip 11. The metal swage All plug 41 forms a continuous and cohesive joint 45 with the inner edge 17. In all six of the methods of forming or adhering the metal plug into the tip opening to form the metal insert, the final width of the metal insert should be substantially equivalent to the width 19 of the actuator arm.

Figure 10:
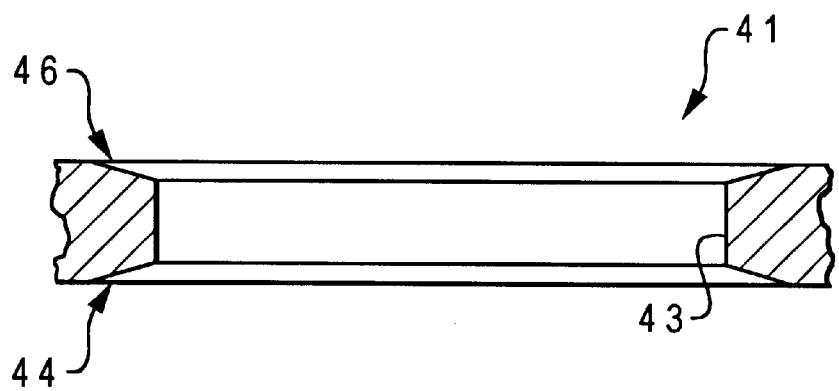
FIG. 10 is a close-up cutaway view of the metal swage plug having beveled annulus edges.

After forming the metal swage plug within the tip opening, the swage annulus 43 must be bored. This step may also be required in the case of a metal insert having a preformed swage annulus as in FIG. 4B, wherein the step of forming or adhering the metal insert within the tip opening may change the desired size and shape of the preformed swage annulus. The swage annulus is bored by conventional machining methods known to those skilled in the art. One desirable method is by conventional drilling, wherein a diameter is chosen to conform to the HGA swage spud. The swage annulus has a predetermined inner swaging diameter chosen to be slightly larger than the swage spud used to attach the HGA. Further, the swage annulus 43 may be bored, or subsequently milled or machined by means known to those skilled in the art, in such a way as to create a complex geometry along the annulus. For example, the swage annulus 43 may be beveled on the bottom edge 44, the top edge 46, or both edges 44 and 46 as shown in FIG. 10. In this embodiment, both the top edge and bottom edge of the annulus are beveled.

Once the swage annulus 43 is bored and subsequent machining or milling is complete, the swage joint can be formed. The swage joint is formed by forcing the spud, typically steel, into the swage annulus, the swage annulus deforming slightly to accommodate the spud. The expanding swage spud interferes with the softer swage annulus, plastically deforming the annulus as it "bites" to form a connection. This action may also act to further seat the metal swage plug 41 within the tip opening 15, especially in the case where forging is used as the method of forming or adhering the metal plug into the tip opening since the cooling of the molten metal may cause the material to shrink slightly. The swage annulus 43 may be further machined to from a desirable geometry to better hold the ball coupled to the HGA.

This invention has several advantages over the prior art. This invention combines the benefits of using a swage coupling between the HGA and actuator arm and the benefits of having a ceramic actuator arm. While ceramic arms have a number of benefits that enhance the speed and efficiency of the read/write function of the HGA, the ceramic material tends to crack and chip when it is machined to attach the HGA to the actuator arm.

The metal insert of the invention allows for the use of swaging, which thus allows deswaging and reuse of actuator arms and E-blocks. The metal is more ductile than the ceramic material of the arm and thus easily deforms to allow swaging.

The method of the invention is versatile in allowing for various means of forming the insert in the actuator arm tip opening. Thus, cold forming, forging, die casting, thixoforming, or pressure infusion casting may be used to form the metal swage plug into the tip opening to form the metal insert, while an adhesive can be used to attach the metal swage plug in the tip opening to form the metal insert.

While the invention has been particularly shown and described with reference to a preferred embodiment, it will be understood by those skilled in the art that various changes in form and detail may be made therein without departing from the spirit and scope of the invention.

What is claimed is:

1. A method of forming a swagable metal actuator arm tip having a metal swage plug for ceramic actuator arms, the method comprising:
    providing at least one actuator arm formed from a ceramic material and having a tip opening, the tip opening having an inner edge of a defined thickness;
    providing a metal insert; and
    placing the metal insert within the tip opening and forming or adhering the metal insert within the tip opening, the formed or adhered metal insert thus constituting a metal swage plug, the metal swage plug having a thickness that is substantially similar to the thickness of the inner edge and having an outer edge that makes cohesive contact with the inner edge of the tip opening.

2. The method of claim 1, further comprising the step of boring a swage annulus within the metal swage plug, the swage annulus having a predetermined inner swaging diameter, the predetermined inner swaging diameter being sized to accept a swage ball coupling of a tip gimbal assembly, whereby the metal swage plug provides a means of attaching the tip gimbal assembly to the actuator arm.

3. The method of claim 2, wherein the swage annulus is further machined or milled to form a complex geometry in the swage annulus.

4. The method of claim 1, wherein the metal insert is formed within the tip opening by thixoforming a metal into the tip opening.

5. The method of claim 1, wherein the metal insert is formed within the tip opening by cold-forming a preformed metal plug into the tip opening.

6. The method of claim 1, wherein the metal insert is formed within the tip opening by forging a molten metal into the tip opening and allowing the metal to cool within the tip opening.

7. The method of claim 1, wherein the metal insert is formed within the tip opening by inserting a pre-formed metal plug into the tip opening, the metal plug having a contact surface, at least the contact surface being coated with an adhesive suitable for adhering metal to the ceramic material of the inner edge of the tip opening.

8. The method of claim 1, wherein the metal insert is formed within the tip opening by pressure infusion casting.

9. The method of claim 7, wherein the actuator arm is part of an E-block.

10. The method of claim 8, wherein a thin layer of conductive metal is formed on the E-block simultaneously to the formation of the metal swage plug in the actuator arm tip openings.

11. The method of claim 1, wherein the inner edge of the tip opening has an irregular shape.

12. The method of claim 1, wherein the tip opening has serrations formed on the inner edge.

13. The method of claim 1, wherein the swage annulus is formed by drilling a hole having the desired inner swaging diameter.

14. The method of claim 1, wherein the metal insert is formed from aluminum.

15. The method of claim 1, wherein the metal insert is formed from zinc.

16. The method of claim 1, wherein the metal insert is formed from magnesium.

17. The method of claim 1, wherein prior to forming the metal insert, a thin film of a metal is sputtered onto at least the inner edge.

18. The method of claim 1, wherein the tip opening may take the form of a generally circular, closed space within the actuator arm tip.

19. The method of claim 1, wherein the tip opening may be a non-continuous shape cut or formed into the tip edge of the actuator arm.

20. A method of forming a swagable metal actuator arm tip having a metal swage plug for ceramic actuator arms, the method comprising:
    providing at least one actuator arm formed from a ceramic material and having a tip opening, the tip opening having an inner edge of a defined thickness; and
    forming or adhering a metal insert within the tip opening, the formed or adhered metal insert thus constituting a metal swage plug having a thickness that is substantially similar to the thickness of the inner edge and having an outer edge that makes cohesive contact with the inner edge of the tip opening.

21. The method of claim 20, further comprising the step of boring a swage annulus within the metal swage plug, the swage annulus having a predetermined inner swaging diameter, the predetermined inner swaging diameter being sized to accept a swage ball coupling of a tip gimbal assembly, whereby the metal swage plug provides a means of attaching the head gimbal assembly to the actuator arm.

22. The method of claim 21, wherein the swage annulus is further machined or milled to form a complex geometry in the swage annulus.

23. The method of claim 20, wherein the metal insert is formed within the tip opening by thixoforming a metal into the tip opening.

24. The method of claim 20, wherein the metal insert is formed within the tip opening by cold-forming a preformed metal plug into the tip opening.

25. The method of claim 20, wherein the metal insert is formed within the tip opening by forging a molten-metal into the tip opening and allowing the metal to cool within the tip opening.

26. The method of claim 20, wherein the metal insert is formed within the tip opening by inserting a pre-formed metal plug into the tip opening, the metal plug having a contact surface, at least the contact surface being coated with an adhesive suitable for adhering metal to the ceramic material of the inner edge of the tip opening.

27. The method of claim 20, wherein the metal insert is formed within the tip opening by pressure infusion casting.

28. The method of claim 27, wherein the actuator arm is part of an E-block.

29. The method of claim 28, wherein a thin layer of conductive metal is formed on the E-block simultaneously to the formation of the metal swage plug in the actuator arm tip openings.

30. The method of claim 20, wherein the inner edge of the tip opening has an irregular shape.

31. The method of claim 20, wherein the tip opening has serrations formed on the inner edge.

32. The method of claim 20, wherein the swage annulus is formed by drilling a hole having the desired inner swaging diameter.

33. The method of claim 20, wherein the metal insert is formed from aluminum.

34. The method of claim 20, wherein the metal insert is formed from zinc.

35. The method of claim 20, wherein the metal insert is formed from magnesium.

36. The method of claim 20, wherein prior to forming the metal insert, a thin film of a metal is sputtered onto at least the inner edge.

37. The method of claim 20, wherein the tip opening may take the form of a generally circular, closed space within the actuator arm tip.

38. The method of claim 20, wherein the tip opening may be a non-continuous shape cut or formed into the tip edge of the actuator arm.

* * * * *